(12) United States Patent  
Singal et al.

(10) Patent No.: US 12,170,610 B2  
(45) Date of Patent: Dec. 17, 2024

(54) ZONING CONFIGURATIONS AND BORDER GATEWAY PROTOCOL (BGP) ROUTE MAPS FOR ROUTE ADVERTISEMENTS

(71) Applicant: DELL PRODUCTS L.P., Round Rock, TX (US)

(72) Inventors: Pawan Kumar Singal, Milpitas, CA (US); Erik Smith, Douglas, MA (US); Balaji Rajagopalan, Sunnyvale, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 379 days.

(21) Appl. No.: 17/830,318

(22) Filed: Jun. 1, 2022

(65) Prior Publication Data

US 2023/0396530 A1  Dec. 7, 2023

(51) Int. Cl.
*H04L 45/00* (2022.01)
*H04L 45/02* (2022.01)
*H04L 45/302* (2022.01)

(52) U.S. Cl.
CPC ............ *H04L 45/26* (2013.01); *H04L 45/026* (2013.01); *H04L 45/04* (2013.01); *H04L 45/308* (2013.01)

(58) Field of Classification Search
CPC ....... H04L 45/26; H04L 45/026; H04L 45/04; H04L 45/308
See application file for complete search history.

(56) References Cited

U.S. PATENT DOCUMENTS

2022/0091872 A1* 3/2022 Huilgol ............... G06F 9/45558
2024/0015074 A1* 1/2024 Gunuganti .......... H04L 41/0894

* cited by examiner

*Primary Examiner* — Hashim S Bhatti
(74) *Attorney, Agent, or Firm* — BAUGH LAW, LLC

(57) ABSTRACT

Systems and methods use zoning configuration to construct border gateway protocol (BGP) route maps. The constructed route maps may then be used to selectively advertise routes between BGP peer devices without having to advertise all available routes to all entities or subsystems in a network. Advantageously, this significantly reduces potential security risks to the network and improves scalability of services in non-volatile memory express over Fabric and other systems.

20 Claims, 15 Drawing Sheets

1300

```
┌─────────────────────────────────────────────┐
│ USE A ZONING CONFIGURATION TO CREATE A ROUTE │
│ POLICY THAT ASSOCIATES A FIRST BORDER GATEWAY│─ 1305
│ PROTOCOL (BGP) PEER DEVICE AND A SECOND BGP  │
│              PEER DEVICE                     │
└─────────────────────────────────────────────┘
                      │
                      ▼
┌─────────────────────────────────────────────┐
│ IN A BGP ROUTE ADVERTISEMENT, COMMUNICATE THE│
│ ROUTE POLICY TO THE FIRST BGP PEER DEVICE THAT│
│ USES THE ROUTE POLICY TO IDENTIFY A ROUTE THAT│─ 1310
│ THE FIRST BGP PEER DEVICE SHOULD ADVERTISE TO │
│ THE SECOND BGP PEER DEVICE TO ESTABLISH A    │
│     CONNECTION BETWEEN THE TWO DEVICES       │
└─────────────────────────────────────────────┘
```

FIG. 13

ZONING CONFIGURATIONS AND BORDER GATEWAY PROTOCOL (BGP) ROUTE MAPS FOR ROUTE ADVERTISEMENTS

BACKGROUND

A. Technical Field

The present disclosure relates generally to information handling systems. More particularly, the present disclosure relates to network communications systems and methods for efficiently creating BGP route maps to optimize route advertisement to end-devices in non-volatile memory express over-fabrics (NVMe-oF™) and other environments.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In NVMe-oF™/Transmission Control Protocol (TCP) deployments when a host and subsystems are reachable via a Layer 3 (L3) IP network, each host and subsystem needs route information inserted into its routing table to enable reachability. Today, such route information is provided by an administrator who manually configures the route table to ensure packets utilize the correct network interface. Alternatively, route information may be automatically inserted into the routing table by software, e.g., nvme-stas, that inspects multicast Domain Name System (mDNS) packets and responses to a Get Log Page command, or support for the Border Gateway Protocol (BGP) can be enabled on end-devices e.g., FRR, Quagga, Bird, etc., to natively insert these routes. This mechanism provides a way to add the requisite route information programmatically based on network reachability and topology. However, such use of BGP on end-devices to solve routing problems has significant drawbacks and adds another layer of complexity. For example, since a host device ideally learns routes only for those subsystems that it has access to and vice versa, advertising all available routes to all entities or subsystems in a network not only poses a potential security risk to the network but also drastically impedes scalability of services in NVMe-oF™ and other systems.

Accordingly, it is highly desirable to overcome the limitations of existing systems by finding new and more efficient ways to construct route maps for end-devices and determine the manner in which routes are advertised such that devices need not unnecessarily learn a large number of routes.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 13 depicts a simplified flowchart for using zoning configurations and BGP route maps in an NVMe-oF™ system, according to embodiments of the present disclosure.

DETAILED DESCRIPTION OF EMBODIMENTS

Figure 1:
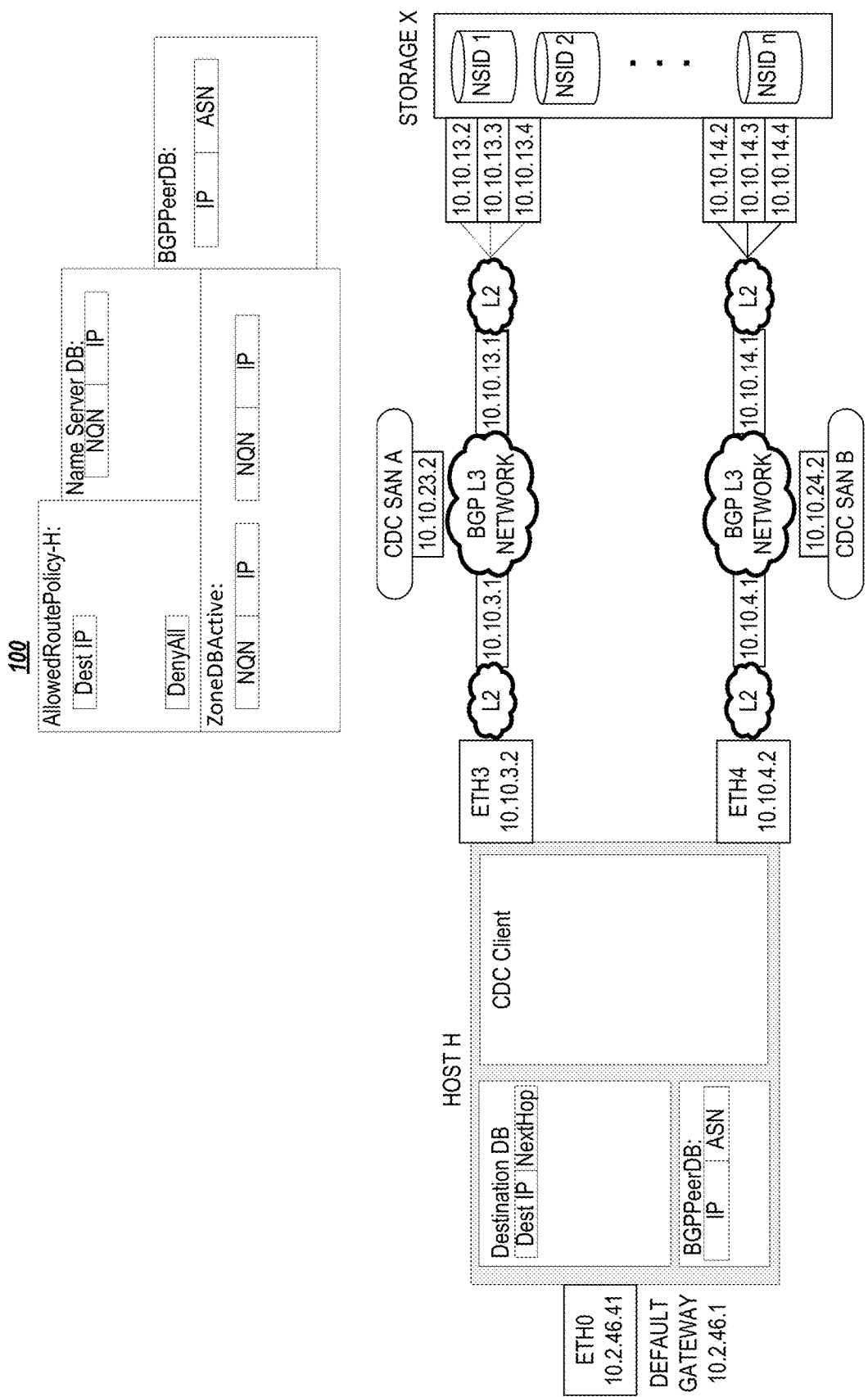
FIG. 1 depicts an exemplary NVMe-oF™ system, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks, and the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

Each reference or document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall be noted that although embodiments described herein may be generally described within the context of calls, commands, and responses, e.g., an mDNS response, applied to NVMe-oF™ fabric transports in L3 IP SANs, aspects of the present disclosure are not so limited and may be applied or adapted for use in other contexts, using any number and type of commands, information, fabric transport and translating mechanisms, etc., to efficiently exchange information across information handling systems according to the objectives of the present disclosure.

In this document, the term "discovery controller" refers to centralized discovery controllers and direct discovery controllers. The terms "allowed list" and "access list" may be used interchangeably. Similar, the terms "BGP neighbor," "BGP peer," and "BGP peer device" may be used interchangeably. Each reference/document mentioned herein is incorporated by reference herein in its entirety.

Generally, BGP route-maps provide a relatively simple mechanism to control which routes a BGP neighbor, BGP peer, or group of BGP peers accepts and advertises. Route-maps allow a system to determine whether predefined conditions in an access list have been satisfied and to set properties accordingly. In addition to enabling route maps on a per-neighbor basis, BGP provides granularity as to whether route map rules, e.g., learning and advertising rules, are to be enforced in an ingress or egress direction. Embodiments herein take advantage of such granularity to construct particular route maps that allow these routes to be advertised to certain BGP peer devices. In various embodiments, this may be accomplished by constructing route maps based on zoning configurations, e.g., by applying NVMe-oF™-TCP zoning rules to the route map construction process.

Using a centralized discovery controller (CDC) in NVMe-oF™ systems enables zoning to be configured, e.g., on a CDC-basis such as to ensure that certain hosts have access to some but not all subsystems in the system and vice-versa. Zoning may be performed manually, e.g., based on user policies that are enforced via a CDC-controlled API, or it may be subsystem-driven zoning, e.g., zoning that is deduced from the namespace masking definition configured on the subsystem. As will be understood by a person of skill in the art, zoning information, in essence, allows communication between a pair of IP addresses while maintaining some constraints.

Various embodiments herein utilize zoning to limit advertising of routes to those devices that are intended to communicate over particular routes. Advantageously, this reduces network traffic, complexity, and the burden on system resources such as computational costs, look-up times, and the like. In addition, no long-lived connections need to be established and maintained, subsystems need not unnecessarily answer queries, and hosts need not discover subsystems with which they need not communicate.

FIG. 1 depicts an exemplary NVMe-oF™ system, according to embodiments of the present disclosure. NVMe-oF™ system 100 may be implemented, for example, as an Ethernet L3 IP SAN and may comprise Host H and Storage X that, in the example in FIG. 1, are coupled via a routed L3 networks comprising CDCs (denoted as CDC SAN A and CDC SAN B). CDC's perform discovery and inventory management functions associated with respective SAN A and SAN B. In one or more embodiments, CDC SAN A in NVMe-oF™ system 100, which may be implemented, for example, on a switch or router may comprise a zoning database (denoted as ZoneDBActive in FIG. 1), a name server database (denoted as Name Server DB), a BGP peer database (denoted as BGPpeerDB), and an allowed list (denoted as AllowedRoutePolicy H). Similarly, Host H may comprise a destination database (denoted as destination DB), a BGP peer database (also denoted as BGPpeerDB), and a CDC client. It is noted that the use of a CDC is not necessary to accomplish the objectives of the present disclosure as any other suitable network device may be used to perform the desired functions.

In one or more embodiments, CDC SAN A's zoning database may store entries that allow Host H to access interfaces (e.g., interface 10.10.13.2) at Storage X. CDC SAN A's name server database may store entries that indicate that a particular interface is connected to Storage X. The destination database of Host H may be used to store destination IP addresses (denoted as Dest IP in FIG. 1) and next hop information (denoted as NextHop), and Host H's BGP peer database may be used to store BGP peer information according to any known protocol in the art.

As depicted, Host H is communicatively coupled with three network interfaces (eth0, eth3, and eth4) that each may communicate to a different network. In the exemplary NVMe-oF™ system 100, network interface eth0 has IP address 10.2.46.41, network interface eth3 has IP address 10.10.3.2, and network interface eth4 has IP address 10.10.4.2. A person of skill in the art will appreciate that each interface, in turn, may be communicatively coupled with any number of entities or components. For example, eth3 is communicatively coupled, via CDC SAN A, with ports on Storage X that are denoted as having IP addresses 10.10.13.2 through 10.10.13.4. Similarly, eth4 is communicatively coupled, via CDC SAN B, with ports on Storage X having IP addresses 10.10.14.2 through 10.10.14.4. It is noted that similar considerations apply to CDC SAN B and its interfaces. For sake of simplicity, zoning and other databases for CDC SAN B are not shown in FIG. 1 through FIG. 11.

In operation, it is desirable that Host H initiate communication with CDC SAN A and CDC SAN B to discover and communicate with respective ports 10.10.13.2 through and 10.10.14.2 through 10.10.14.4 on Storage X. Assuming that Host H seeks access to Storage X at destination IP address 10.10.13.2 and IP address 10.10.14.2, these two destination IPs are considered to be on different networks than Host H (i.e., they do not match the existing destination addresses 10.10.3.x or 10.10.4.x that the destination database of Host H may be configured for). Therefore, to establish the sought-after connectivity, Host H's CDC client, e.g., nvme-stas, which may be implemented on Host H, and Host H's destination database may be used to configure Host H in a manner such as to communicate with specific IP addresses. The destination database may then be used by the CDC client to maintain information of discovered entities and associate network entities or subsystems with specific network interfaces.

It is noted that not shown in FIG. 1 are storage management interfaces and other components that one of skill in the art would readily recognize as necessary for the proper operation of networks such as NVMe-oF™ system 100.

Figure 2:
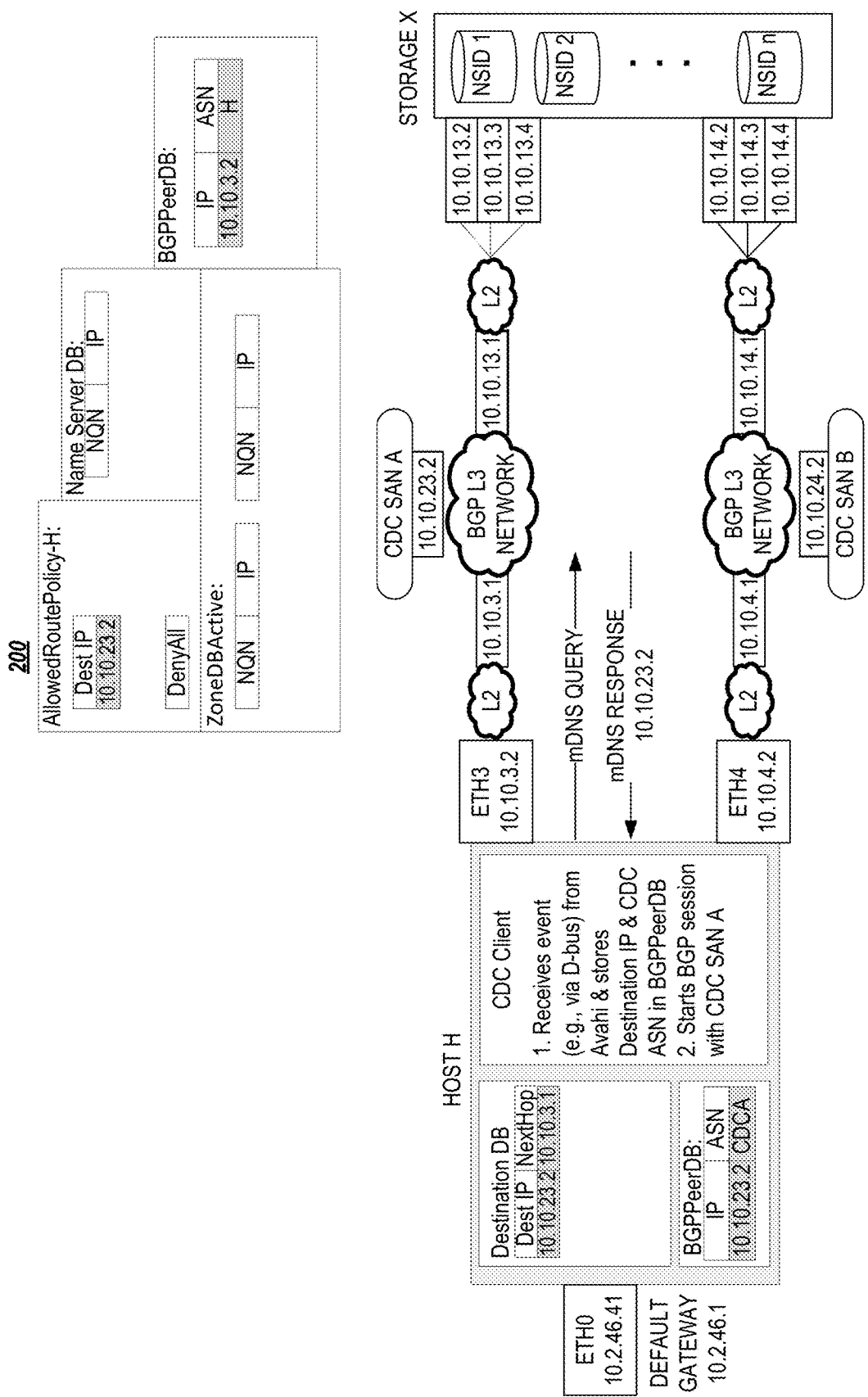
FIG. 2 depicts the use of mDNS to configure a host, according to embodiments of the present disclosure.

FIG. 2 depicts the use of mDNS to configure a host, according to embodiments of the present disclosure. For clarity, components similar to those shown in FIG. 1 are labeled in the same manner. The CDC client in NVMe-oF™ system 100 may use an open-source software package that has an mDNS client, such as the Avahi daemon, to discover services and/or CDCs using mDNS.

In operation, the CDC client may send via interface eth3 (and eth4) an mDNS query (or similar message) on a multicast address that asks network entities (e.g., CDC SAN A) within the routed network that support an NVMe® discovery service (e.g., _nvme-disc or similar service) to identify themselves. In one or more embodiments, upon receipt of the mDNS query, CDC SAN A may store the IP address of Host H interface Eth 3 as a destination IP in an access list for Host H to indicate that Host H may communicate with CDC SAN A. CDC SAN A may further store the information about the network interface from which the mDNS query was sent in the CDC's BGP peer database to learn that network interface 10.10.3.2 should be used to establish a connection to Host H having the autonomous system number (ASN) H.

In one or more embodiments, CDC SAN A may respond to the query with an mDNS response, e.g., in the form of a self-identifying multicast message, that may comprise BGP peering information, such as the ASN for CDC SAN A and IP address 10.10.23.2 of CDC SAN A. Upon receipt of the mDNS response to the mDNS query, Host H may extract the BGP peering from the mDNS response and store some or all of the discovered information to create an entry in Host H's BGP peer database located within Host H, e.g., to commence a BGP session. In addition, Host H may establish an implicit persistent connection with CDC SAN A. Once Host H discovers a device (or service) using mDNS, it may use a controller initialization process, e.g., to create an explicit persistent connection.

Figure 3:
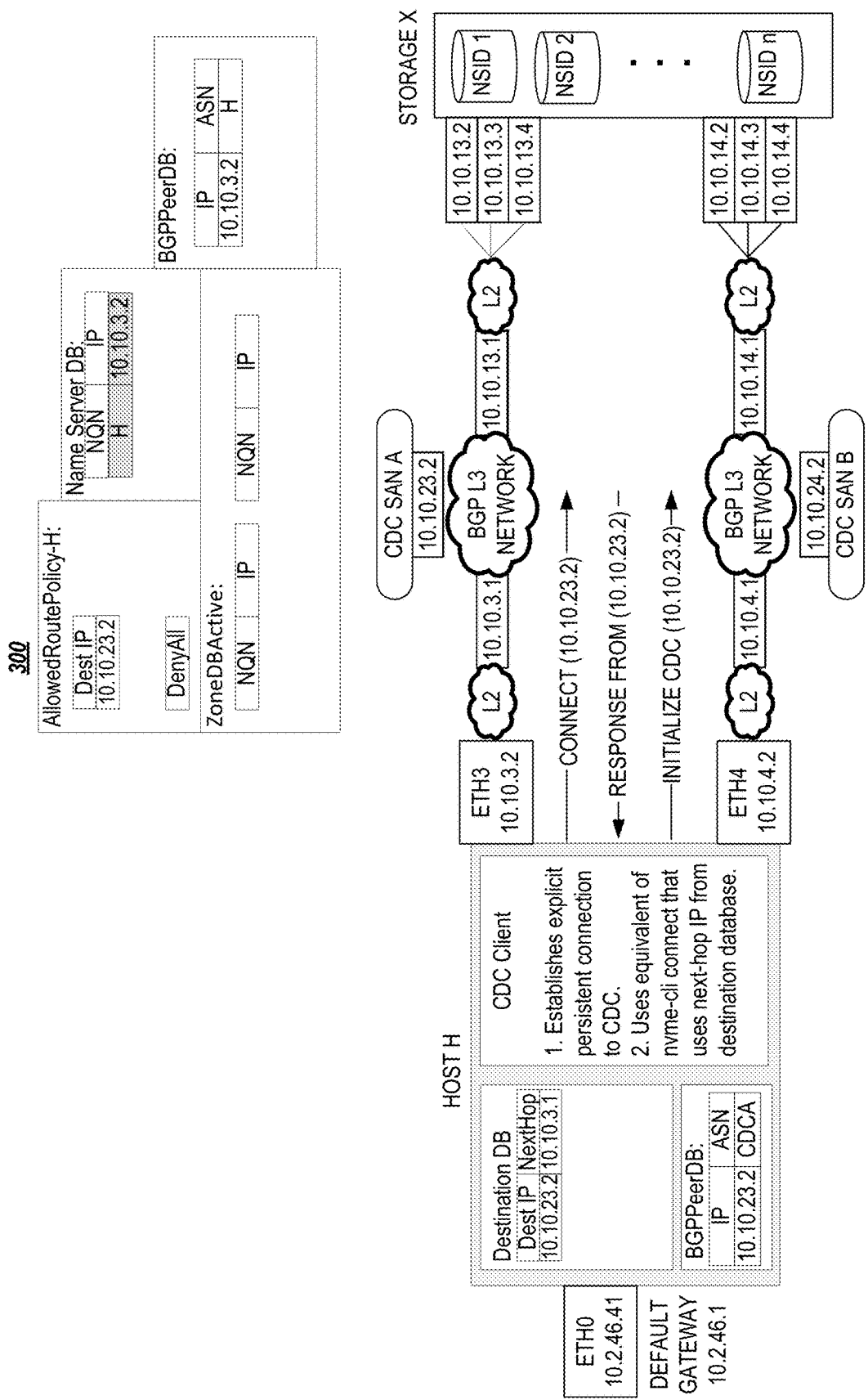
FIG. 3 depicts connecting to and initializing a CDC, according to embodiments of the present disclosure.

FIG. 3 depicts connecting to and then initializing a CDC, according to embodiments of the present disclosure. For purposes of brevity, a description of components similar to those shown in FIG. 2 or their function is not repeated here. In one or more embodiments, as a result of the CDC client discovering from the mDNS response it has received the IP address (10.10.23.2) and ASN of CDC SAN A, Host H has discovered CDC SAN A as a peer device. The CDC client may, thus, use the entry in Host H's BGP peer database in a controller initialization process that involves using that entry to establish a connection to and exchange information with CDC SAN A.

In one or more embodiments, once a connection is established, e.g., prior to CDC SAN A responding to a connection request by Host H, CDC SAN A may use information in the connection request to update its name server database, e.g., by adding a NVMe® Qualified Name (NQN) H and the IP address 10.10.3.2 of the Host H's interface to the name server database, to indicate that Host H is implicitly registered with the CDC SAN A's IP address. It is understood that any type of information or command, e.g., a registration command that comprises a symbolic name, may be used to explicitly register Host H with CDC SAN A, e.g., to more easily identify Host H by an administrator.

Figure 4:
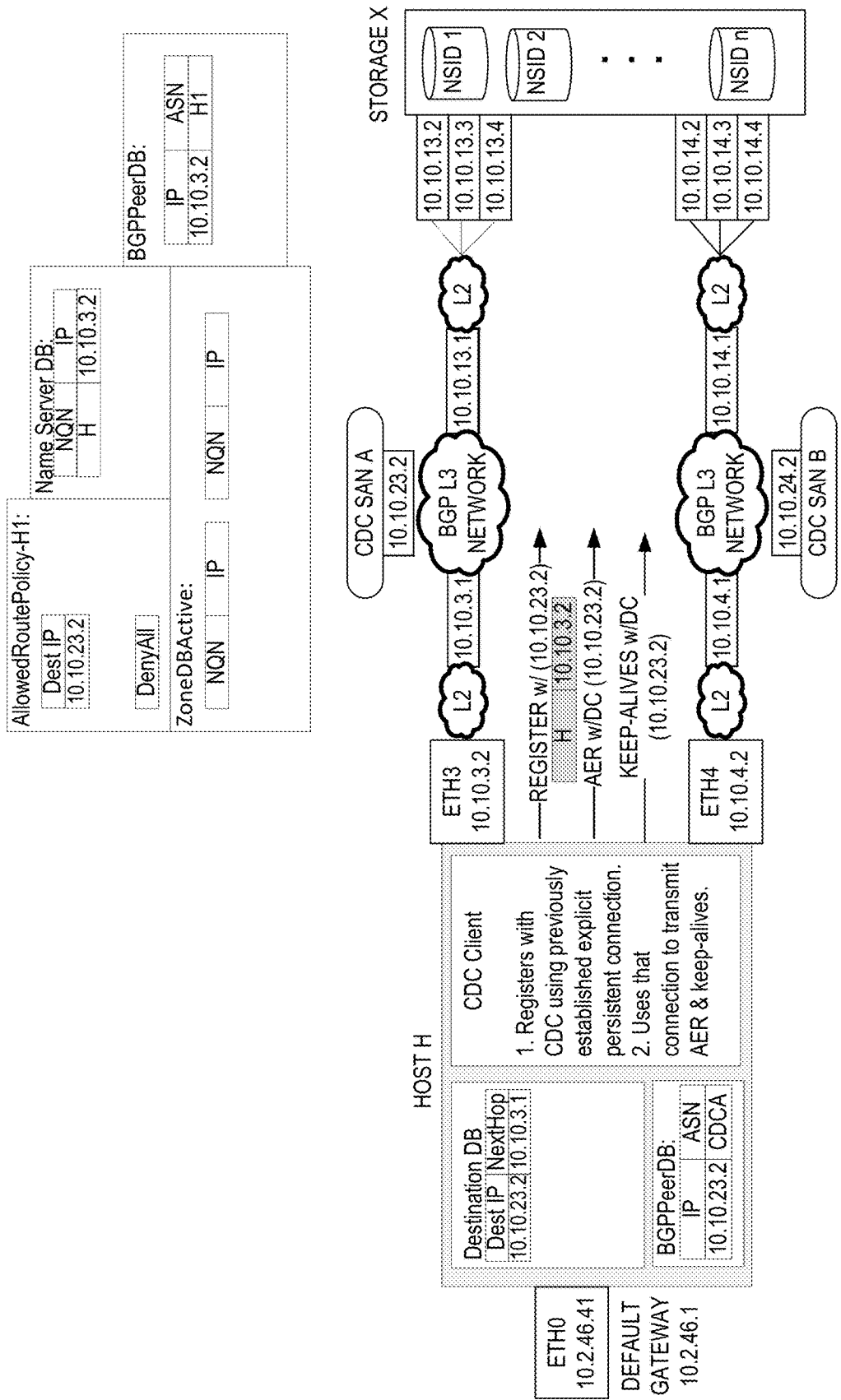
FIG. 4 depicts registering with a CDC, according to embodiments of the present disclosure.

In one or more embodiments, Host H may use the discovered information to establish an explicit persistent connection between Host H's network interface (eth3) and CDC SAN A by using a connect command using the nexthop IP address in its destination database, which may be added to an NVMe® connect command. Once the BGP peer databases and/or name server databases are dynamically updated and the explicit persistent connection has been established, the connection may be used for any type of traffic. As indicated in FIG. 4, in one or more embodiments, Host H may use the connection to communicate Asynchronous Event Requests (AERs) and keep-alive commands to maintain the communication, initialize IP controllers, obtain name spaces, and so on, to facilitate proper operation in the NVMe-oF™ environment. As one of skill in the art will appreciate, similar considerations apply to CDC SAN B, its CDC client, and its destination and BGP peer databases, which for sake of simplicity are not shown herein.

Figure 5:
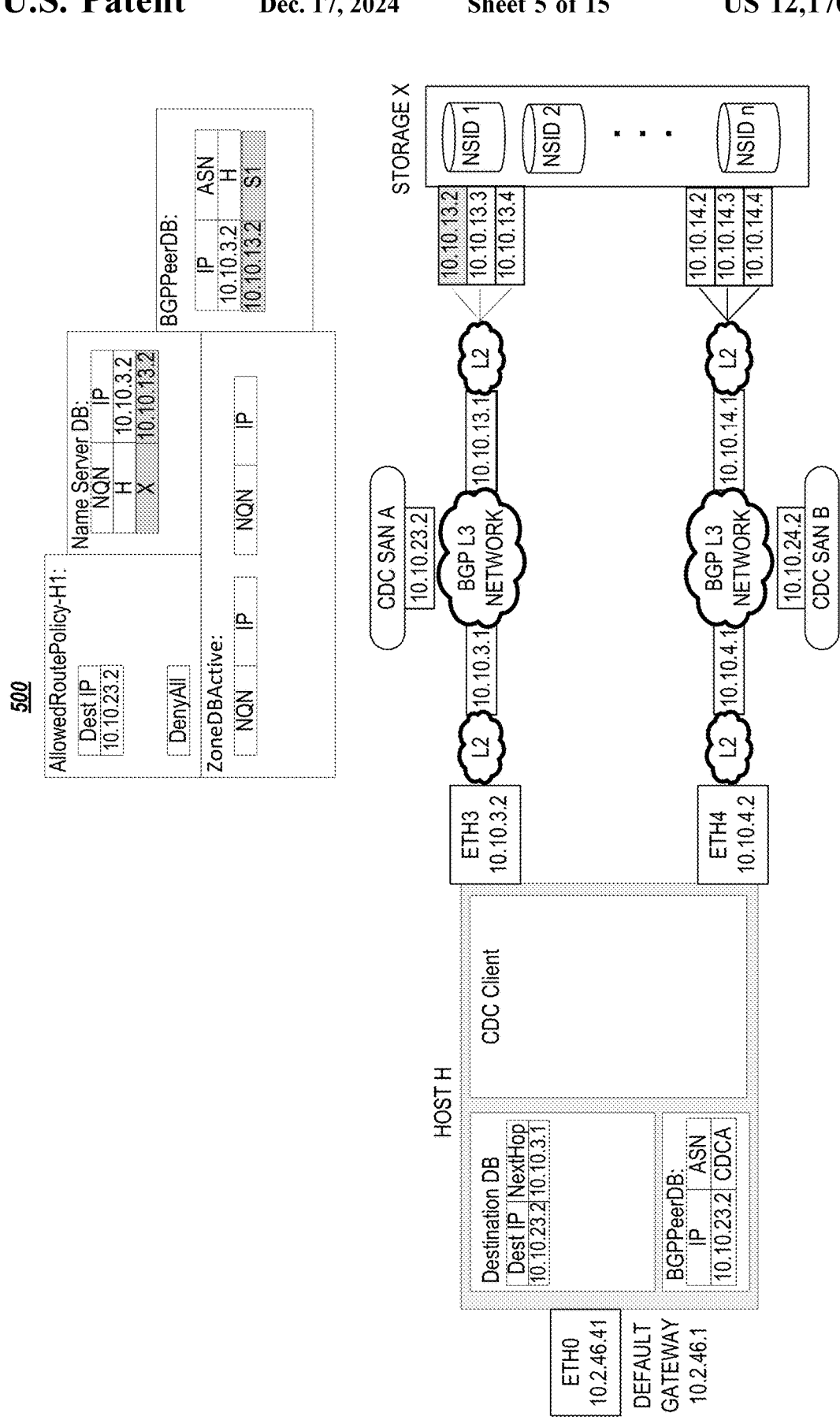
FIG. 5 depicts using network information to configure BGP entries in the CDC's BGP peer database, according to embodiments of the present disclosure.

FIG. 5 depicts using network information to configure BGP entries in the CDC's BGP peer database, according to embodiments of the present disclosure. As shown in FIG. 5, in one or more embodiments, since CDC SAN A has discovered Host H and the subsystem as part of the BGP configuration, the CDC's BGP peer database may be populated with entries comprising the IP address (10.10.13.2) and ASN (S1) of the access interface at Storage X. Similarly, the CDC's name server database may be populated with entries comprising Storage X's ASN (X) and the interface IP address of (10.10.13.2) that access interface. At this point, no rule has been established to allow Host H and the subsystem to communicate with each other. Therefore, in one or more embodiments, zoning information, which may be configured by a user, may be used to allow Host H to access interface 10.10.13.2 at Storage X and vice versa.

Figure 6:
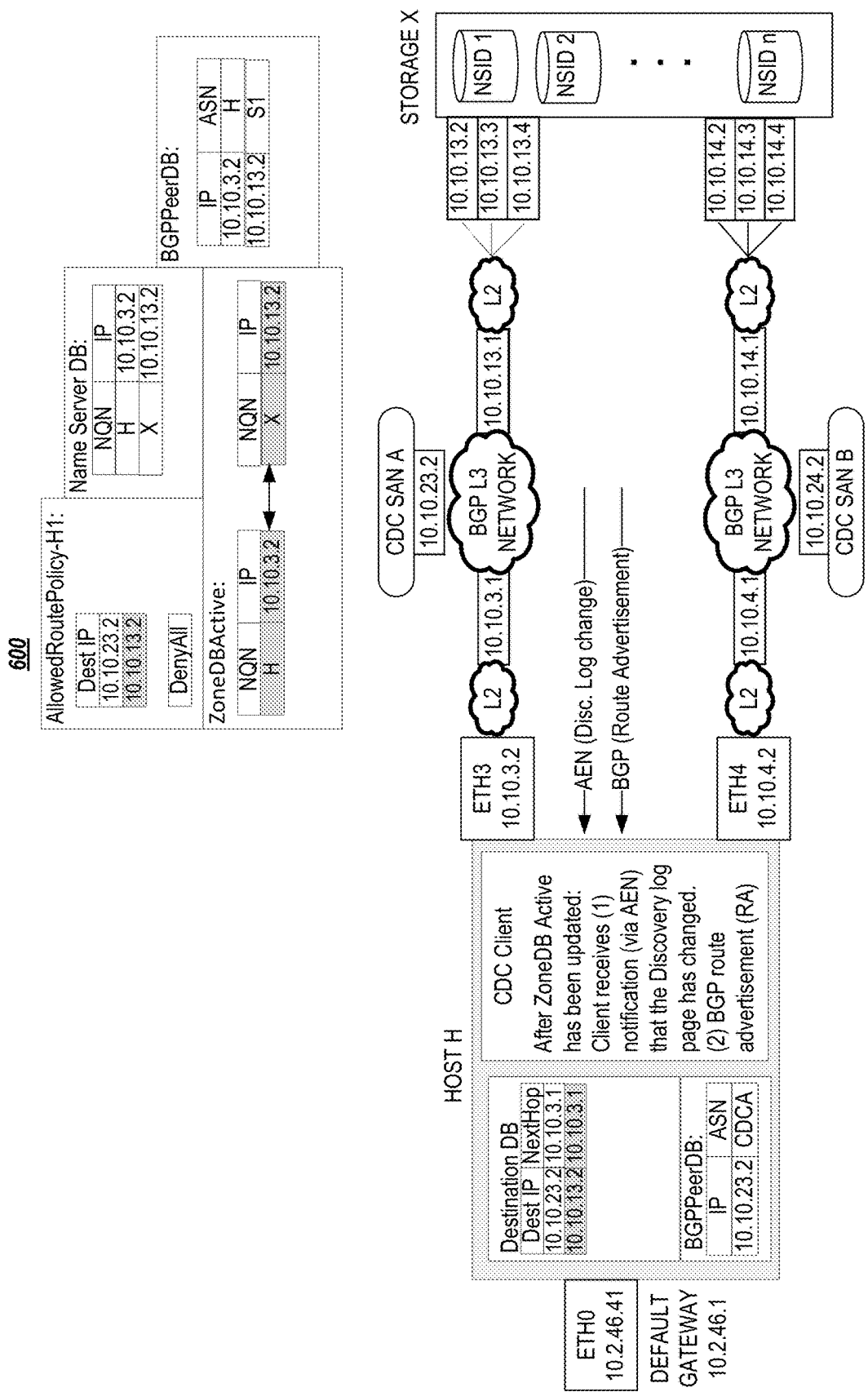
FIG. 6 depicts using zoning information and BGP route maps to create route policies, according to embodiments of the present disclosure.

FIG. 6 depicts using zoning information and BGP route maps to create route policies for an NVMe-oF™ system, according to embodiments of the present disclosure. In one or more embodiments, CDC SAN A may tag routes received from Host H or other end-device with an identifier, such as an NQN and/or IP address that may serve as a "host-ID," which identifies the Host H and comprises routing information for reaching Host H. Similarly, CDC SAN A may tag routes received from a subsystem or other end-device with an identifier that may serve as a "subsystem-ID," which identifies the subsystem and comprises routing information for reaching that subsystem.

In one or more embodiments, Host H's access list may comprise routes that are tagged with a permitted subsystem-ID to identify sub-systems that Host H may talk to and may be constructed based on zoning information. The access list may serve as a BGP access list that comprises routes that should be advertised to Host H identified by the host-ID and applied to a BGP neighbor, here, storage ports on Storage X. As result, Host H will see only those routes that lead to subsystems that are discoverable by virtue of the CDC SAN A's zoning configuration, and vice-versa. Zoning configurations (i.e., zone groups) maintained by CDC SAN A may be a unit of activation, i.e., a set of access control rules that are enforceable by the CDC. Zone groups may comprise data structures that may be maintained and managed (e.g., created, read, modified, deleted, etc.) in a CDC's zoning database.

As depicted, CDC SAN A's zoning database comprises entries for NQN and IP addresses for Host H and an interface of Storage X. It is understood that, although not shown in FIG. 6, CDC SAN A may maintain a corresponding zoning database for each storage interface on Storage X. In one or more embodiments, once CDC SAN A's zoning database comprises an entry that indicates that Host H and interface 10.10.13.2 may communicate with each other, CDC SAN A may add interface 10.10.13.2 to Host H's access list to indicate that interface 10.10.13.2 is a permissible destination address for Host H.

Once Host H's destination database is active or updated, e.g., in response to a user adding a new host that may communicate with a subsystem, route maps and the access list may be updated accordingly. For example, CDC SAN A may interact with the API of a router on which CDC SAN A operates to update its route map, e.g., by adding subsystem 10.10.13.2. A new entry that identifies the new host may be added to the subsystem's route map. Once the subsystem's route map is enabled, BGP may advertise the newly added route in a new change notification to indicate how to reach subsystem 10.10.13.2.

It is noted that, in embodiments, Host H's access list may comprise a default rule or entry comprising an action to deny access, e.g., to prevent unwanted advertising of automatically created BGP sessions. Instead, selected routes would be advertised to hosts and subsystems. Further, as discussed below with reference to FIG. 9, CDC SAN A may notify the CDC client, via Asynchronous Event Notifications (AENs) that a discovery log page has changed and may share information from the access list with the CDC client. Further, in one or more embodiments, CDC SAN A may associate a route map with a BGP session and send a BGP route advertisement to the CDC client. The route advertisement may indicate that the route map has changed to indicate that Host H is allowed to communicate with storage subsystem X at interface 10.10.13.2. The CDC client may use the information in the BGP route advertisement to update Host H's destination database to reflect the change in the route map. In addition, the source IP address (10.10.3.1) of the mDNS response may be entered into Host H's destination database as the next hop address.

Figure 7:
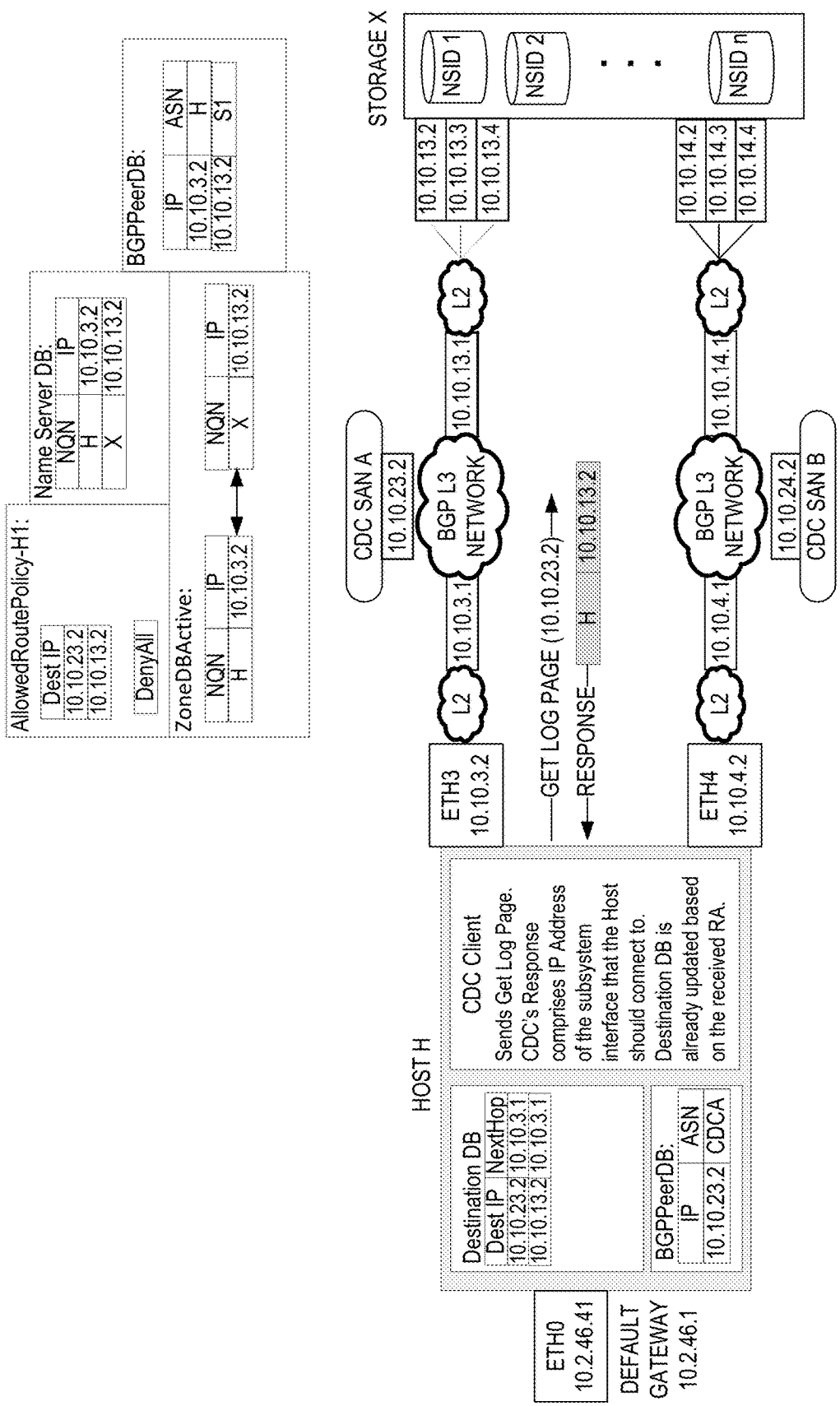
FIG. 7 depicts an exemplary response to a Get Log Page command, according to embodiments of the present disclosure.

It is noted that once CDC SAN A subsequently sends a response to a Get Log Page command that CDC SAN A receives from the CDC client, as shown in FIG. 7, the CDC client may receive a response that comprises a discovery log page entry regarding interface 10.10.13.2, i.e., network information that the CDC client has already received and updated in Host H's destination database.

Figure 8:
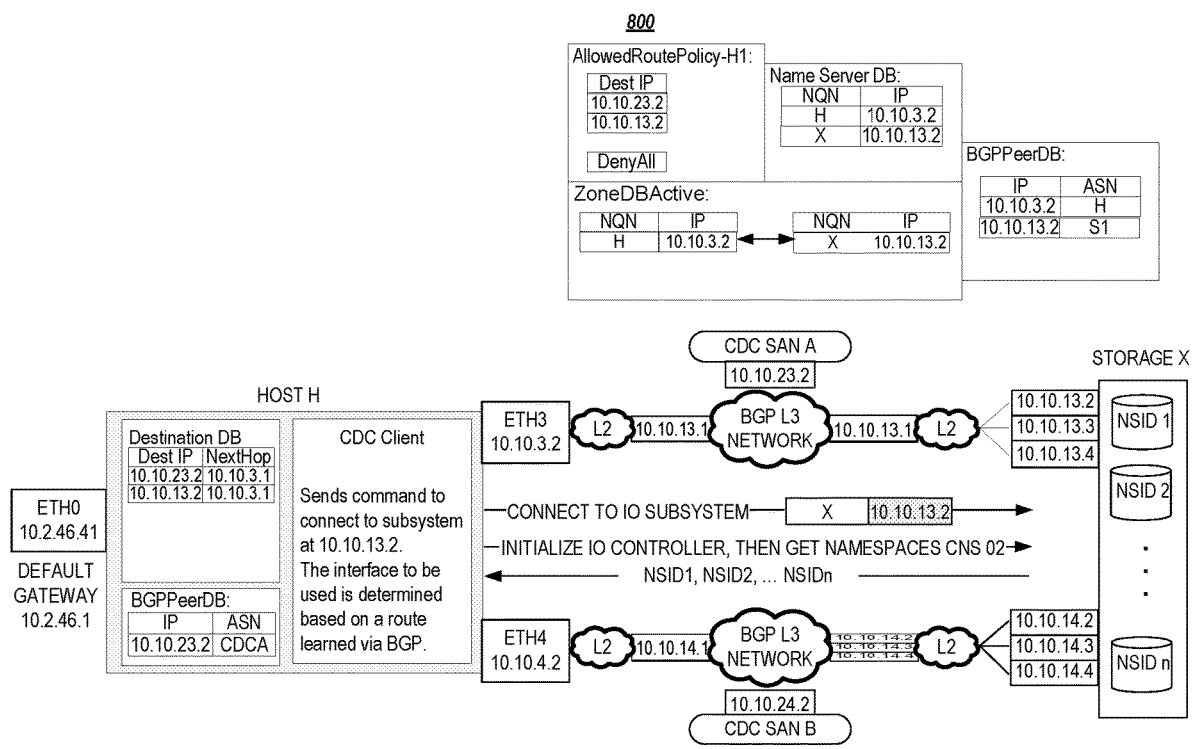
FIG. 8 depicts using route policies for an end-to-end connection to access subsystems in the exemplary NVMe-oF™ system in FIG. 1, according to embodiments of the present disclosure.

FIG. 8 depicts using route policies for an end-to-end connection to access subsystems in the exemplary NVMe-oF™ system in FIG. 1, according to embodiments of the present disclosure. In one or more embodiments, Host H may send a connect command to create an input/output (I/O) connection from Host H to IP address 10.10.13.2 at subsystem Storage X to establish an end-to-end connection. Host H may do so by utilizing the route that has been learned via BGP. Host H may further use IP address 10.10.13.2 to obtain controller namespaces, denoted in FIG. 8 as name server IDs NSID 1, NSID 2, . . . NSID n.

It is noted that the controller namespaces should be made available to the host operating system (not shown). A person of skill in the art will appreciate that Host H and CDC SAN A may undergo a similar process to facilitate connectivity between Host H and I/O subsystem 10.10.13.3 and 10.10.13.4.

Figure 9:
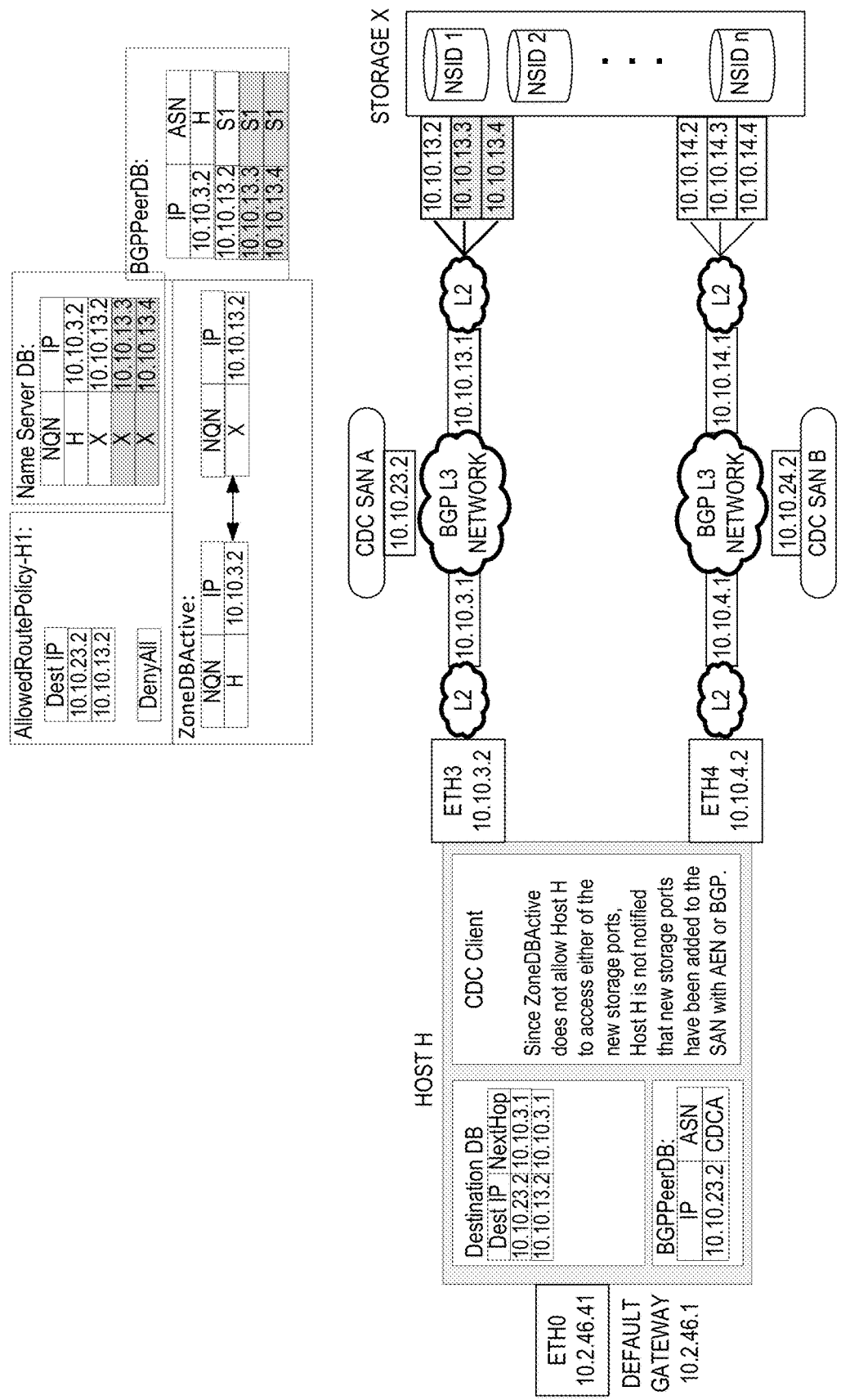
FIG. 9 depicts adding storage interfaces to a name server database, according to embodiments of the present disclosure.

FIG. 9 depicts how Storage X interfaces 10.10.13.3 and 10.10.13.4 register with CDC SAN A's name server database, according to embodiments of the present disclosure. If CDC SAN A's zone database does not yet allow Host H to access either of storage interfaces or 10.10.13.4, Host H is not notified, via AEN or BGP, that these storage ports have been added to the SAN. Although not shown in FIG. 9, certain processes, such as the creation of automatic BGP configurations and establishing BGP sessions shown for storage interface may be performed for storage interfaces 10.10.13.3 and 10.10.13.4 to populate CDC SAN A's BGP peer and name server databases.

Figure 10:
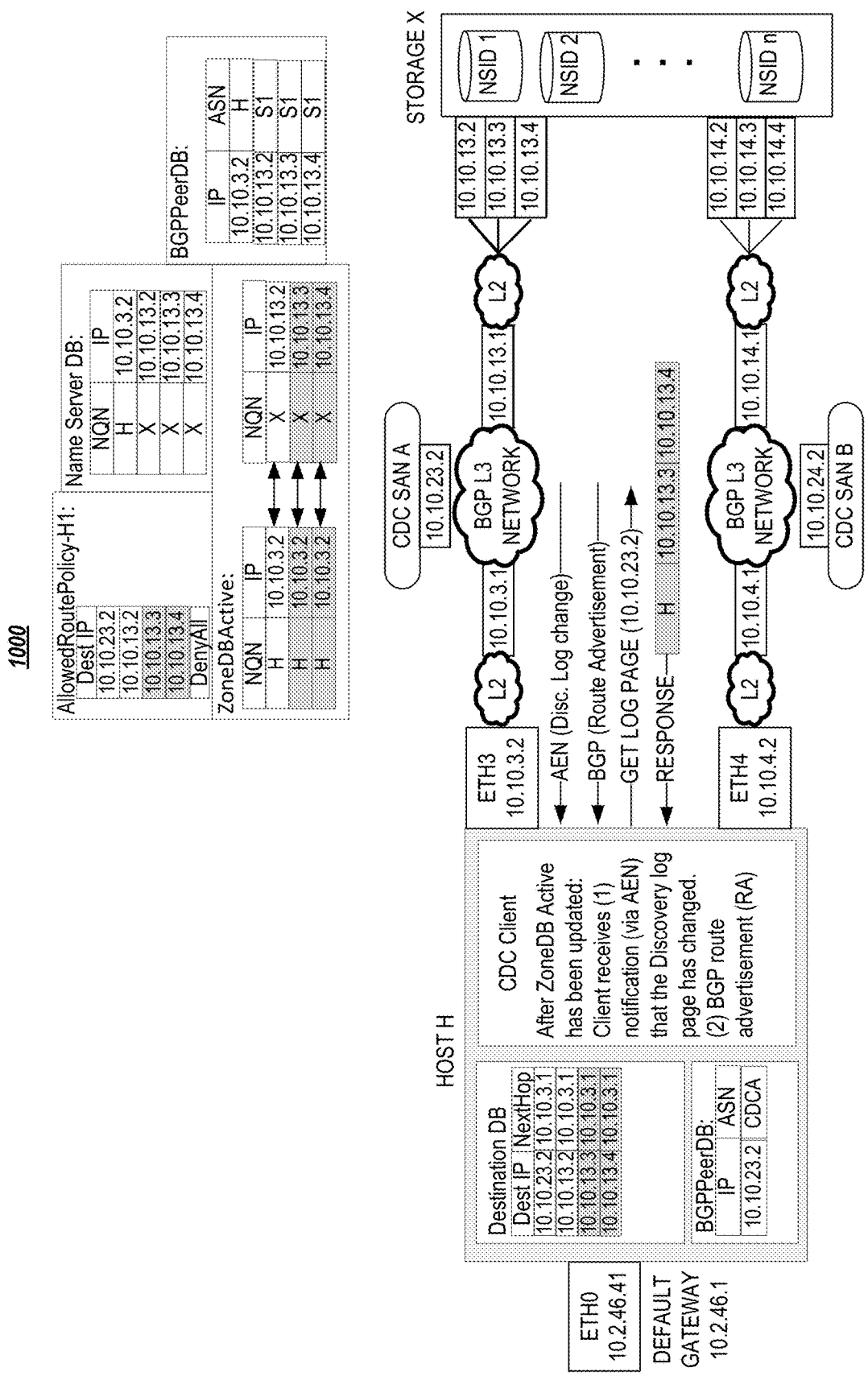
FIG. 10 depicts an updated zoning database, according to embodiments of the present disclosure.

As for storage interface 10.10.13.2, a user may update the CDC SAN A's zoning database to allow Host H to communicate with storage interfaces 10.10.13.3 and 10.10.13.4. After CDC SAN A's zoning database has been updated, as indicated in FIG. 10, the CDC client, as previously mentioned with reference to FIG. 6 and FIG. 7, may be notified via AEN that the discovery log page has changed. In one or more embodiments, the CDC client may receive one or more AENs and BGP route advertisements and may respond to the notification(s) with another request for discovery log entries. CDC SAN A may then respond with information about the subsystems 10.10.13.3 and 10.10.13.4 on Storage X such as interface IP addresses 10.10.13.3 and 10.10.13.4, which may be made available to Host H for inclusion in its destination database, thus, indicating that Host H may communicate with each of these interfaces.

Figure 11:
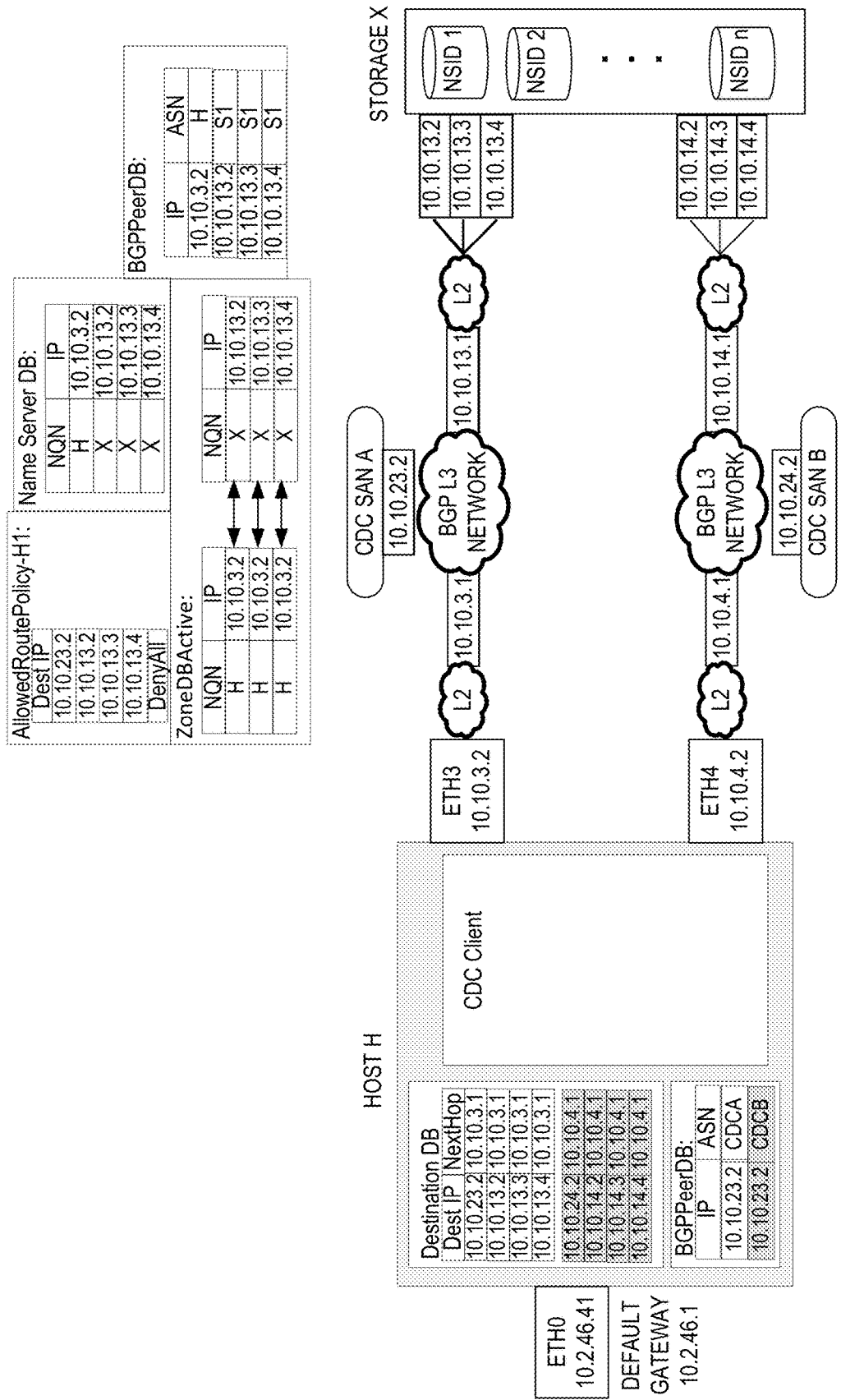
FIG. 11 depicts the exemplary NVMe-oF™ system in FIG. 1 with fully built routes that have been dynamically configured according to embodiments of the present disclosure.

A person of skill in the art will appreciate that some or all of the previous steps may be repeated for each interface that supports NVMe-oF™, e.g., interface 10.10.4.2 associated with CDC SAN B and interfaces 10.10.14.2-10.10.14.4 on Storage. A resulting exemplary NVMe-oF™ system comprising a set of fully built routes that have been dynamically configured, according to embodiments of the present disclosure, is depicted in FIG. 11.

Figure 12:
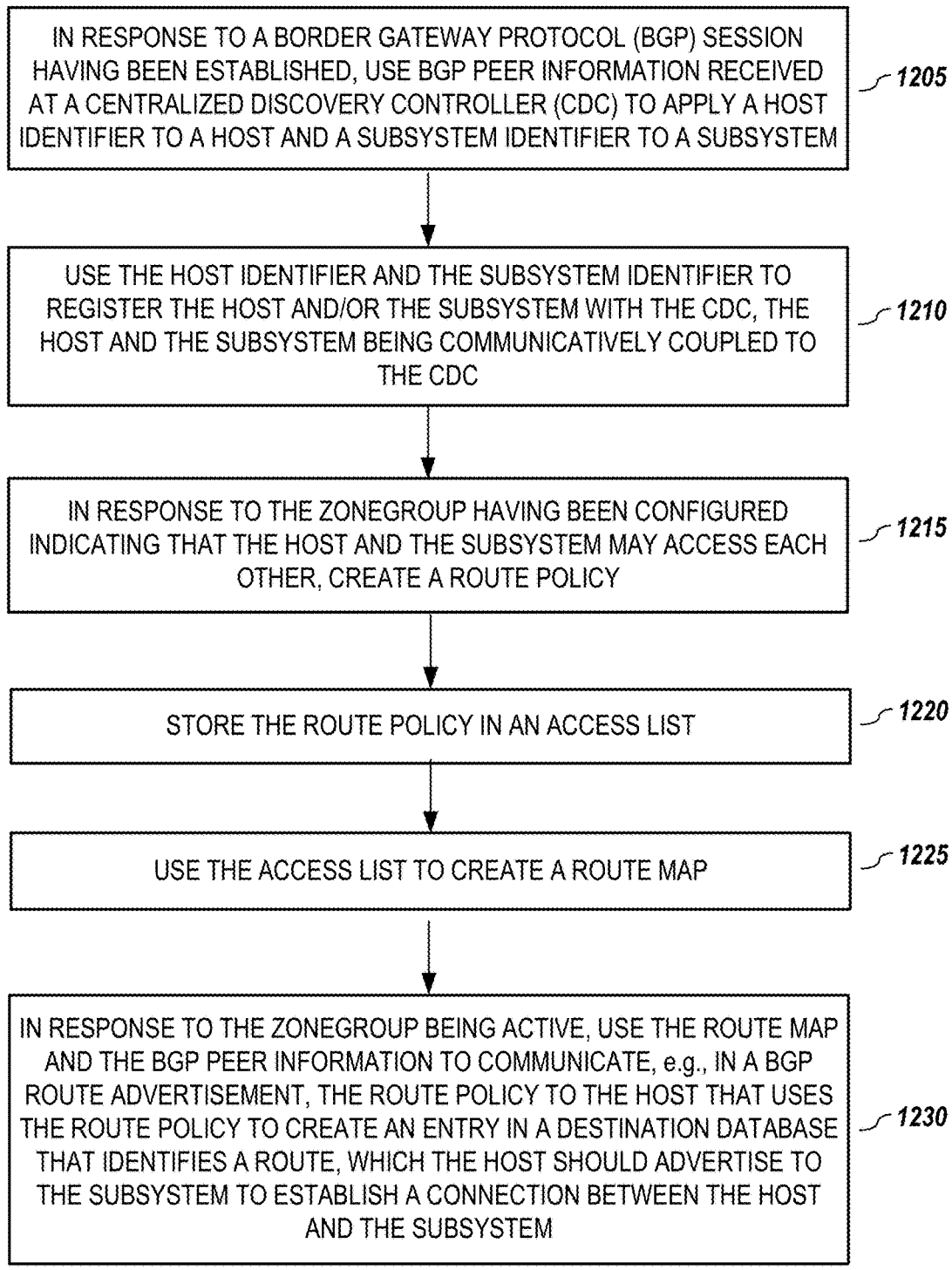
FIG. 12 depicts a flowchart of an exemplary process using zoning configurations and BGP route maps in an NVMe-oF™ system to connect end-point devices, according to embodiments of the present disclosure.

FIG. 12 depicts a flowchart of an exemplary process using zoning configurations and BGP route maps in an NVMe-oF™ system to connect end-point devices, according to embodiments of the present disclosure. In one or more embodiments, process 1200 for using zoning configurations and BGP route maps may start when, in response to a BGP session having been established, BGP peer information that has been received, e.g., at a CDC is used to apply (1205) a host identifier to a host and a subsystem identifier to a subsystem. The host identifier and the subsystem identifier may be used to register (1210) the host and the subsystem with the CDC, which may be communicatively coupled with the host and the subsystem.

In one or more embodiments, The CDC may create (1215) a route policy, e.g., by using a zoning configuration that may be stored in a zoning database within the CDC. The zoning configuration may indicate that the host and the subsystem are permitted to access each other. The CDC may store (1220) the route policy in an access list and use the access list to create (1225) a route map. Then, the route map and the BGP peer information may be used to communicate (1230), e.g., in a BGP route advertisement, the route policy to the host. In one or more embodiments, the Host may use the route policy to create an entry in a destination database that identifies a route that the host should advertise to the subsystem to establish the connection between the host and the subsystem.

As a result, the use of a protocol such as BGP may ensure that only selected routes are automatically advertised to the host and the subsystem. It shall be noted that: (1) certain steps may optionally be performed; (2) steps may not be limited to the specific order set forth herein; (3) certain steps may be performed in different orders; and (4) certain steps may be done concurrently.

FIG. 13 depicts a simplified flowchart for using zoning configurations and BGP route maps in an NVMe-oF™ system, according to embodiments of the present disclosure. In one or more embodiments, process 1300 for using zoning configurations and BGP route maps may start when a CDC uses a zoning configuration to create (1305) a route policy that associates a first BGP peer device (e.g., a host) and a second BGP peer device (e.g., a storage device). Then, the CDC may communicate (1310), e.g., in a BGP route advertisement, the route policy to the first BGP peer device, which may use the route policy to identify a route that the first BGP peer device should advertise to the second BGP peer device in order to establish a connection between the two devices.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various I/O devices, such as a keyboard, mouse, stylus, touchscreen, and/or video display. The computing system may also include one or more buses operable to transmit communications between the various hardware components.

Figure 14:
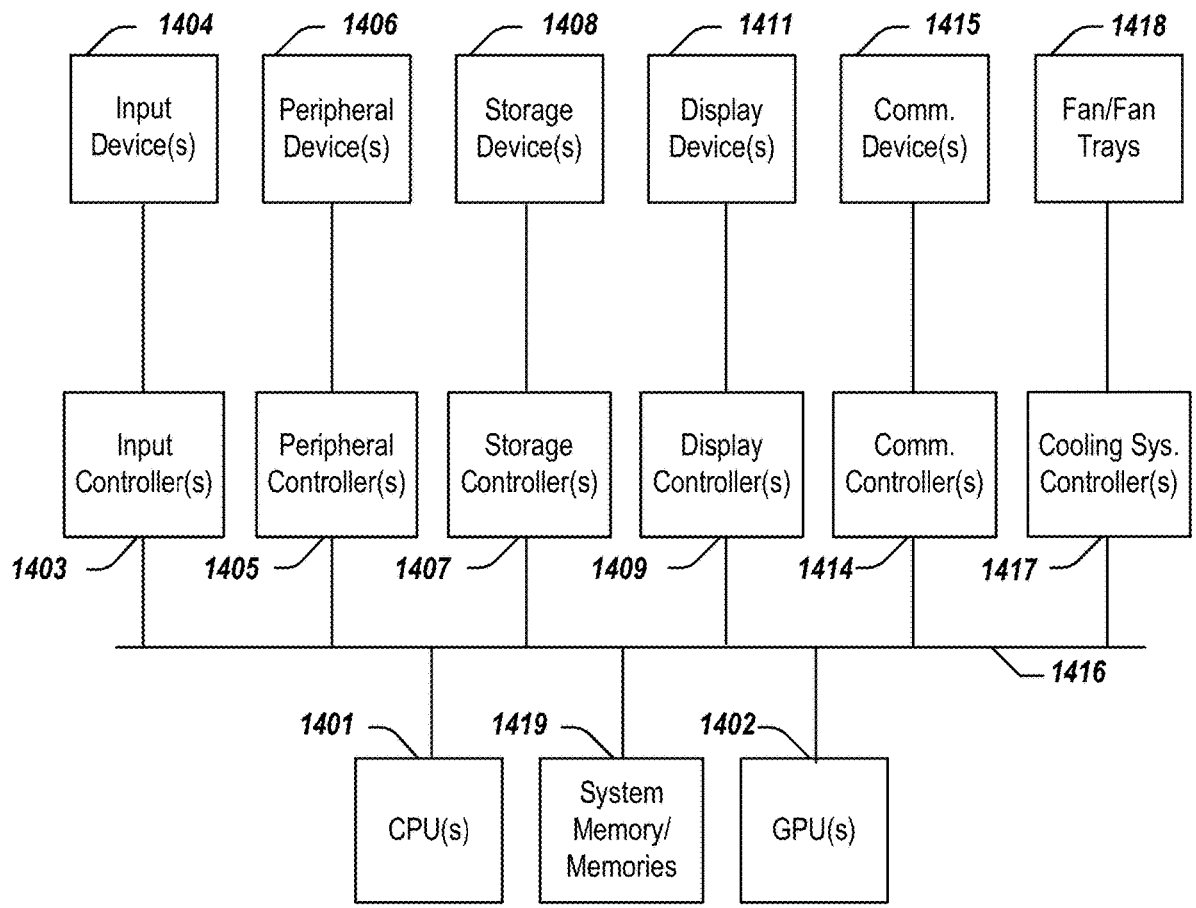
FIG. 14 depicts a simplified block diagram of an information handling system, according to embodiments of the present disclosure.

FIG. 14 depicts a simplified block diagram of an information handling system (or computing system), according to embodiments of the present disclosure. It will be understood that the functionalities shown for system 1400 may operate to support various embodiments of a computing system—although it shall be understood that a computing system may be differently configured and include different components, including having fewer or more components as depicted in FIG. 14.

As illustrated in FIG. 14, the computing system 1400 includes one or more central processing units (CPU) 1401 that provides computing resources and controls the computer. CPU 1401 may be implemented with a microprocessor or the like and may also include one or more graphics processing units (GPU) 1402 and/or a floating-point coprocessor for mathematical computations. In one or more embodiments, one or more GPUs 1402 may be incorporated within the display controller 1409, such as part of a graphics card or cards. The system 1400 may also include a system memory 1419, which may comprise RAM, ROM, or both.

A number of controllers and peripheral devices may also be provided, as shown in FIG. 14. An input controller 1403 represents an interface to various input device(s) 1404, such as a keyboard, mouse, touchscreen, and/or stylus. The computing system 1400 may also include a storage controller 1407 for interfacing with one or more storage devices 1408 each of which includes a storage medium such as magnetic tape or disk, or an optical medium that might be used to record programs of instructions for operating systems, utilities, and applications, which may include embodiments of programs that implement various aspects of the present disclosure. Storage device(s) 1408 may also be used to store processed data or data to be processed in accordance with the disclosure. The system 1400 may also include a display controller 1409 for providing an interface to a display device

1411, which may be a cathode ray tube (CRT) display, a thin film transistor (TFT) display, organic light-emitting diode, electroluminescent panel, plasma panel, or any other type of display. The computing system 1400 may also include one or more peripheral controllers or interfaces 1405 for one or more peripherals 1406. Examples of peripherals may include one or more printers, scanners, input devices, output devices, sensors, and the like. A communications controller 1414 may interface with one or more communication devices 1415, which enables the system 1400 to connect to remote devices through any of a variety of networks including the Internet, a cloud resource (e.g., an Ethernet cloud, a Fibre Channel over Ethernet (FCoE)/Data Center Bridging (DCB) cloud, etc.), a LAN, a wide area network (WAN), a SAN or through any suitable electromagnetic carrier signals including infrared signals. As shown in the depicted embodiment, the computing system 1400 comprises one or more fans or fan trays 1418 and a cooling subsystem controller or controllers 1417 that monitors thermal temperature(s) of the system 1400 (or components thereof) and operates the fans/fan trays 1418 to help regulate the temperature.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 15:
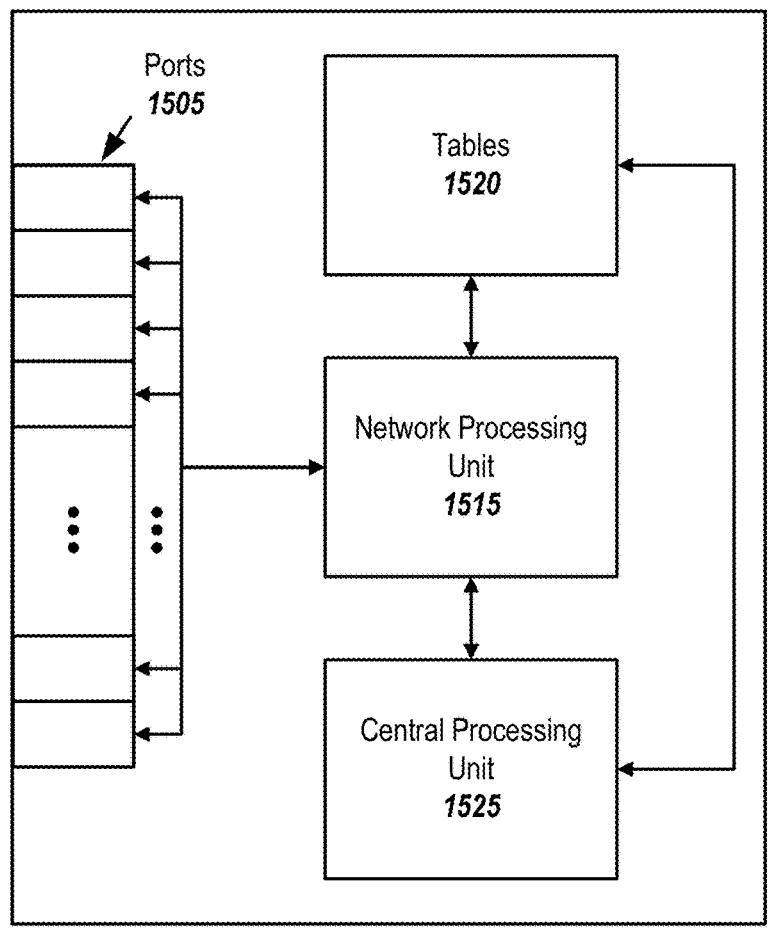
FIG. 15 depicts an alternative block diagram of an information handling system, according to embodiments of the present disclosure.

FIG. 15 depicts an alternative block diagram of an information handling system, according to embodiments of the present disclosure. It will be understood that the functionalities shown for system 1500 may operate to support various embodiments of the present disclosure—although it shall be understood that such system may be differently configured and include different components, additional components, or fewer components.

The information handling system 1500 may include a plurality of I/O ports 1505, a network processing unit (NPU) 1515, one or more tables 1520, and a central processing unit (CPU) 1525. The system includes a power supply (not shown) and may also include other components, which are not shown for sake of simplicity.

In one or more embodiments, the I/O ports 1505 may be connected via one or more cables to one or more other network devices or clients. The network processing unit 1515 may use information included in the network data received at the node 1500, as well as information stored in the tables 1520, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, programmable logic devices (PLDs), flash memory devices, other NVM devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A processor-implemented method for using one or more zoning configurations and one or more border gateway protocol (BGP) route maps in a non-volatile memory express over Fabric (NVMe-oF™) system, the method comprising:
   in response to one or more BGP sessions having been established, using BGP peer information received at a centralized discovery controller (CDC) to apply a host identifier to a host and a subsystem identifier to a subsystem;
   using the host identifier and the subsystem identifier to register at least one of the host or the subsystem with the CDC, the host and the subsystem being communicatively coupled to the CDC;
   in response to a zone group having been configured that indicates that the host and the subsystem may access each other, using a route policy that is stored in an access list to create a route map; and
   in response to the zone group being active, using the route map and the BGP peer information to communicate, in a BGP route advertisement, the route policy to the host that uses the route policy to update or to create an entry in a destination database that identifies a route, which the host should use to establish a connection with the subsystem.

2. The processor-implemented method of claim 1, wherein the host comprises a CDC client, a host interface, and a first BGP peer database, the host using a BGP protocol to receive, at the host interface, first BGP peer information to and store it in the first BGP peer database.

3. The processor-implemented method of claim 2, wherein the first BGP peer information comprises a CDC Internet Protocol (IP) address and a CDC autonomous system number (ASN).

4. The processor-implemented method of claim 3, wherein the CDC client receives the CDC ASN in response to sending out a multicast Domain Name System (mDNS) query.

5. The processor-implemented method of claim 2, wherein the CDC client uses a persistent explicit network connection to perform steps comprising communicating one or more asynchronous event requests, one or more keep-alive commands, or both to the CDC.

6. The processor-implemented method of claim 5, wherein the persistent explicit network connection specifies that traffic should egress from the host interface.

7. The processor-implemented method of claim 5, wherein the CDC stores, in a second BGP peer database, second BGP peer information that specifies that the host interface be used to establish the connection.

8. The processor-implemented method of claim 5, wherein the CDC comprises a name server database to store an NVMe® Qualified Name (NQN) for the host, the host interface, or both.

9. An information handling system comprising:
   one or more processors; and
   a non-transitory computer-readable medium or media comprising one or more sets of instructions which, when executed by at least one of the one or more processors, causes steps to be performed comprising:
      in response to one or more border gateway protocol (BGP) sessions having been established, using BGP peer information received at the information handling system that participates in providing a centralized discovery controller (CDC) to apply a host identifier to a host and a subsystem identifier to a subsystem;
      using the host identifier and the subsystem identifier to register at least one of the host or the subsystem with the CDC, the host and the subsystem being communicatively coupled to the CDC;
      in response to a zone group having been configured that indicates that the host and the subsystem may access each other, using a route policy that is stored in an access list to create a route map; and
      in response to the zone group being active, using the route map and the BGP peer information to communicate, in a BGP route advertisement, the route policy to the host that uses the route policy to update or to create an entry in a destination database that identifies a route, which the host should use to establish a connection the subsystem.

10. The information handling system of claim 9, wherein the host comprises a CDC client, a host interface, and a first BGP peer database, the host using a BGP protocol to receive, at the host interface, first BGP peer information and store it in the first BGP peer database.

11. The information handling system of claim 10, wherein the first BGP peer information comprises a CDC Internet Protocol (IP) address and a CDC autonomous system number (ASN).

12. The information handling system of claim 9 the zone group is made active by, at least in part, being included in an active zone group database.

13. The information handling system of claim 10, wherein the CDC client uses a persistent explicit network connection to perform steps comprising communicating one or more asynchronous event requests, one or more keep-alive commands, or both to the CDC.

14. The information handling system of claim 13, wherein the persistent explicit network connection specifies that traffic should egress from the host interface.

15. The information handling system of claim 13, wherein the CDC stores, in a second BGP peer database, second BGP peer information that specifies that the host interface be used to establish the connection.

16. The information handling system of claim 13, wherein the CDC comprises a name server database to store an NVMe Qualified Name (NQN) for the host, the host interface, or both.

17. A non-transitory computer-readable medium or media comprising one or more sequences of instructions which, when executed by at least one processor, causes steps to be performed comprising:
   in response to one or more border gateway protocol (BGP) sessions having been established, using BGP peer information received at a centralized discovery controller (CDC) to apply a host identifier to a host and a subsystem identifier to a subsystem;
   using the host identifier and the subsystem identifier to register at least one of the host or the subsystem with the CDC, the host and the subsystem being communicatively coupled to the CDC;
   in response to a zone group having been configured that indicates that the host and the subsystem may access each other, using a route policy that is stored in an access list to create a route map; and
   in response to the zone group being active, using the route map and the BGP peer information to communicate, in a BGP route advertisement, the route policy to the host that uses the route policy to update or to create an entry in a destination database that identifies a route, which the host should use to establish a connection the subsystem.

18. The non-transitory computer-readable medium or media of claim 17, wherein the host comprises a CDC client, a host interface, and a first BGP peer database, the host using a BGP protocol to receive, at the host interface, first BGP peer information and store it in the first BGP peer database.

19. The non-transitory computer-readable medium or media of claim 18, wherein the CDC client uses a persistent explicit network connection to perform steps comprising communicating one or more asynchronous event requests, one or more keep-alive commands, or both to the CDC.

20. The non-transitory computer-readable medium or media of claim 18, wherein the CDC stores, in a second BGP peer database, second BGP peer information that specifies that the host interface be used to establish the connection.

* * * * *